United States Patent [19]

Barlow et al.

[11] Patent Number: 4,763,243
[45] Date of Patent: Aug. 9, 1988

[54] RESILIENT BUS SYSTEM

[75] Inventors: George J. Barlow, Tewksbury, Mass.; James W. Keeley, Hudson, N.H.

[73] Assignee: Honeywell Bull Inc., Waltham, Mass.

[21] Appl. No.: 623,264

[22] Filed: Jun. 21, 1984

[51] Int. Cl.[4] .................. G06F 13/14; G06F 13/38; G06F 13/42

[52] U.S. Cl. .................................................. 364/200

[58] Field of Search ... 364/200 MS File, 900 MS File

[56] References Cited

U.S. PATENT DOCUMENTS

| | | | |
|---|---|---|---|
| 3,676,860 | 7/1972 | Collier | 364/200 |
| 3,866,181 | 2/1975 | Gayman et al. | 364/200 |
| 3,993,981 | 11/1976 | Cassarino et al. | 364/200 |
| 4,166,211 | 8/1979 | York et al. | 364/200 |
| 4,281,380 | 7/1981 | DeMesa et al. | 364/200 |
| 4,320,452 | 3/1982 | Kempf et al. | 364/200 |
| 4,371,928 | 2/1983 | Barlow | 364/200 |
| 4,386,416 | 5/1983 | Giltner et al. | 364/900 |
| 4,390,944 | 6/1983 | Quackenbush et al. | 364/200 |
| 4,536,877 | 8/1985 | Livingston | 370/94 |

Primary Examiner—David Y. Eng
Attorney, Agent, or Firm—Faith F. Driscoll; John S. Solakian

[57] ABSTRACT

A data processing system includes a plurality of units which are coupled to transfer requests including data, command and integrity signals between units over a system bus during allocated bus transfer cycles. Each unit includes response apparatus for acknowledging requests received from other units. Each of a number of units further includes retry apparatus and checking apparatus for verifying that all of the parts of a request received from such unit over the bus are valid. When less than all of the parts of the request are detected as valid, the receiving unit does not accept the request and inhibits its response apparatus from generating a response. This prevents damage to system integrity and permits each unit with retry apparatus to retry the request during a subsequent bus transfer cycle.

20 Claims, 7 Drawing Sheets

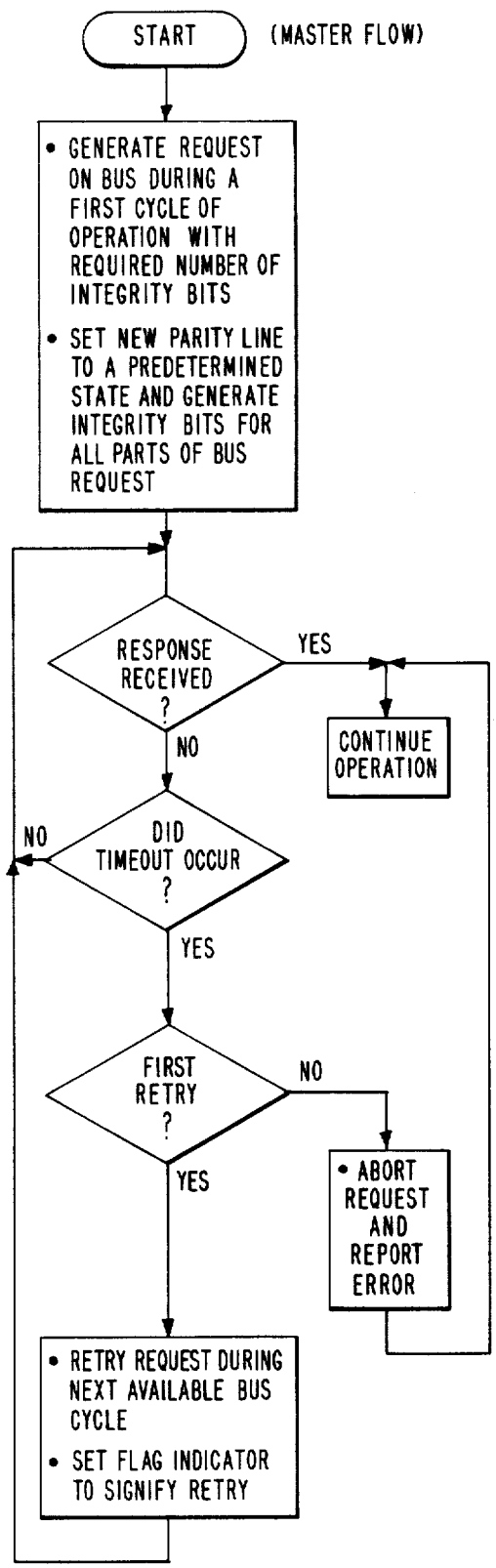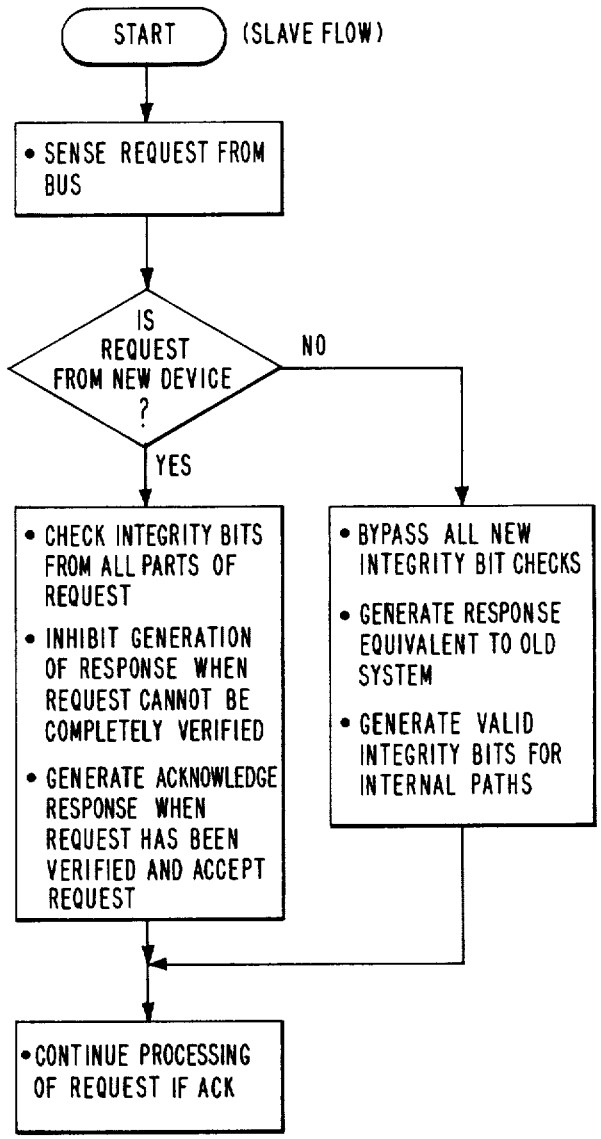
Fig. 4a.
Fig. 4b.

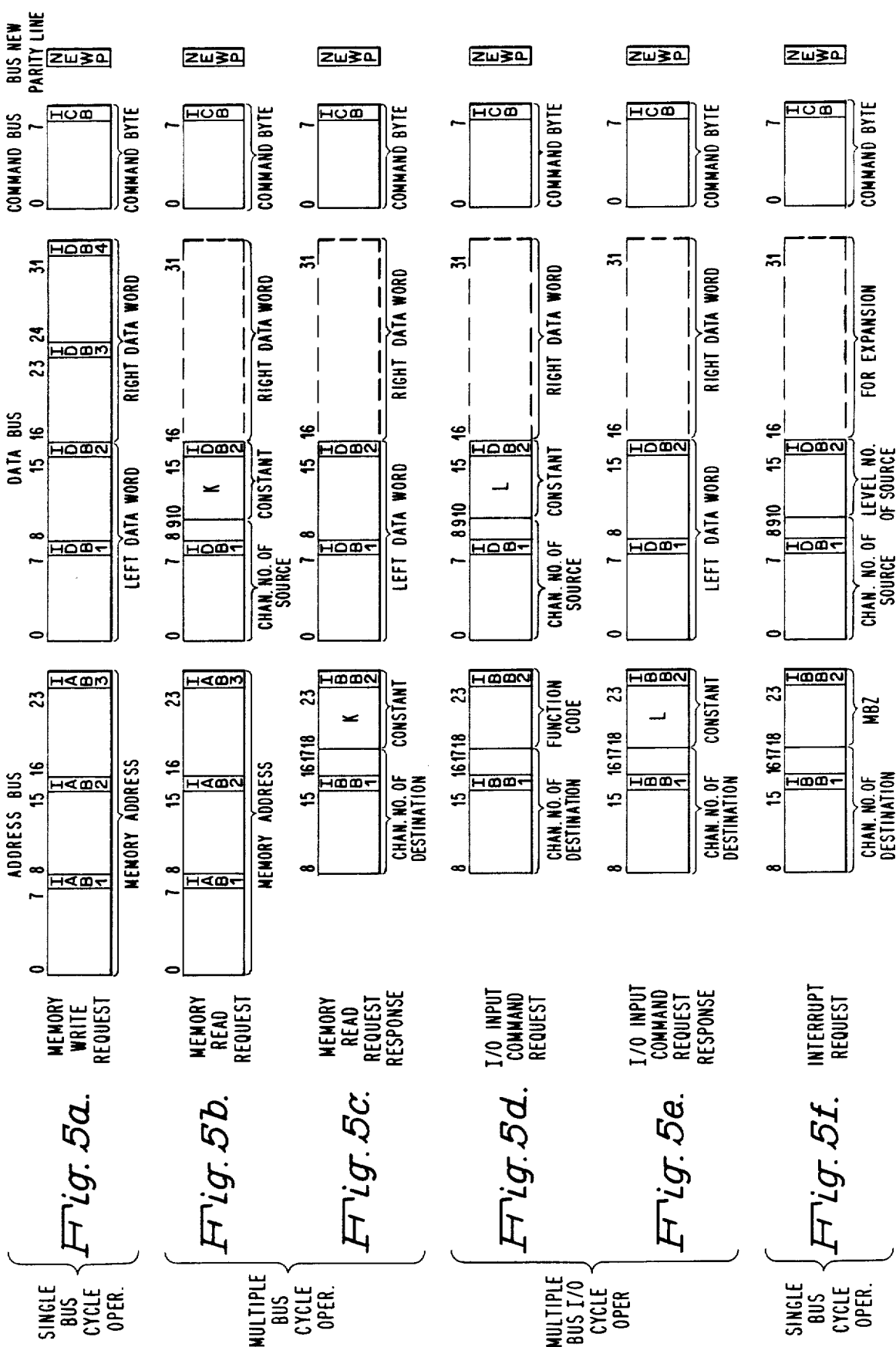

RESILIENT BUS SYSTEM

BACKGROUND OF THE INVENTION

1. Field of Use

This invention pertains to data processing systes and, more particularly, to apparatus for transmitting and receiving requests over a common bus.

2. Prior Art

There are a variety of methods and apparatuses for interconnecting the different unit controllers of a data processing system for transmitting and receiving requests over a common bus. The transfer of requests proceeds either over synchronous or asynchronous generated bus transfer cycles of operation. U.S. Pat. Nos. 3,676,860 and 3,866,181 are illustrative of such systems.

In some systems, it has been the practice to include integrity bits in the data portion of a request. These bits are used to verify the correctness of the data following acceptance of the request by a receiving unit.

U.S. Pat. Nos. 3,993,981 and 4,371,928, assigned to the same assignee as named herein, are illustrative of an asynchronous bus system. These systems have units which are coupled in a priority network which is distributed along the system bus. Each unit has response apparatus for responding to a request for a transfer of information from another unit which provides up to three different types of signal responses. Also, each unit, except memory, has comparator circuits for insuring the integrity of the information being transferred over the bus. The requesting unit or master unit compares the requesting unit's channel portion of each request sent by such unit to a slave unit during a previous bus cycle with the requesting unit address channel received back from the slave unit during a subsequent cycle of operation.

This arrangement only provides a subsequent check for insuring that information was transferred to the unit originating the request. It only indirectly verifies that a request was received by the correct unit. Further, the arrangement contemplates an operating environment in which the units attached to the system bus are not assigned similar channel number addresses and normally only a single memory request is being processed at any given interval of time. However, with the introduction of more efficient techniques of using memory, resulting in simultaneous processing of requests, and an increase in the number of units (e.g. memory controllers, I/O controllers and central processing units) attachable to the system bus, the chance for undetected errors has increased substantially.

The systems disclosed in U.S. Pat. Nos. 3,993,981 and 4,371,928 have provided some additional integrity in addressing a memory controller and its different memory board (i.e., modules). When the memory controller detects having received its address with correct parity and an indication that the module board being addresses has been installed in the system, the controller generates one of three specified responses. If any one of these conditions is not met, the controller does not respond. After a certain period of time, this will generate a time out condition to occur within the system, causing central processing unit to detect an interrupt or trap. Again, the integrity of the system is only insured to the point of correctly addressing the memory controller and preventing the acceptance of a memory request.

This still leaves open the possibility of having good memory data destroyed or incorrect data written into memory. Moreover, by the time the error is detected by the central processing unit, system operation will have progressed to a point where the actual source of the problem cannot be accurately determined. Thus, considerable system processing time has to be expanded in processing such error conditions at the operating system software level without any realistic chance for success. The reason for this is that errors caused by the system bus and associated circuits have been observed to manifest themselves as intermittent conditions rather than as solid failures. That is, certain operating conditions often times create metastable, oscillatory or partial failure modes of operation within the different bistable devices which form part of the system bus priority networks and control circuits. Also, a part or component in the process of failing will operate unreliably thus introducing intermittent errors. Further, unique conditions can arise, such as several units simultaneously requesting system bus access, which cause still another kind of intermittent error condition.

Thus, there is a definite need for a resilient bus arrangement. This is in contrast to trying to increase the reliability of a system bus through the introduction of redundant circuits or special hardware checking facilities.

Accordingly, it is a primary object of the present invention to provide a system which is resilient to errors occurring during bus transfers.

It is a further object of the present invention to provide a system which prevents damage to the integrity of a system's data and operation.

SUMMARY OF THE INVENTION

The above objects of the present invention are achieved by the illustrative embodiment which includes a plurality of units which are coupled to transfer requests including data, command and integrity signals between units over a bus system during allocated bus transfer cycles. Each unit includes response apparatus for acknowledging requests received from other units. Each of a number of units further includes retry apparatus and checking apparatus for verifying that all of the parts of a request received from such unit over the bus system are valid. When less than all of the parts of the request are detected as valid, the receiving unit does not accept the request and inhibits its response apparatus from generating a response. This permits the receiving unit at an early point in a transfer operation to reject the cycle in a way that it is automatically communicated to the requesting unit.

In the present embodiment of the invention, the lack of a response causes the generation of a negative acknowledgement by timeout apparatus which connects to the bus system. This prevents damage to system integrity and permits the requesting unit with retry apparatus to retry the request during a subsequent bus transfer cycle. Also, by having the receiving unit not respond reduces interference and permits the allocation of bus cycles only to those units receiving valid requests. Thus, the present invention utilizes the fact that error conditions caused by the bus system are essentially intermittent. Therefore, a single retrying of the request will correct the error condition, unless it is due to a failure.

In the disclosed embodiment, the present invention is utilized in a data processing system which includes units of older designs. These units do not include the apparatus of the present invention and are unable to perform a checking operation on all of the parts of a request. However, when such older design unit transfers a request to a unit which includes the apparatus of the present invention, the unit generates a response which is the same as the older design unit would have received if being operating in the old system. Additionally, the additional integrity bits generated by the receiving unit can be transferred to other parts of the unit and used for additional checking following acceptance of the request.

Accordingly, the invention finds use in a variety of systems containing mixtures of old and new units. Moreover, the introduction of the apparatus of the present invention does not require any changes in the operation and the circuitry of such old units.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

BRIEF DESCRIPTION OF THE DRAWINGS

FIGS. 4a and 4b are flow charts used to explain the operation of the apparatus of the present invention.

FIGS. 5a through 5f show the formats of the requests and responses generated by the system of FIG. 1 according to the teachings of the present invention.

DESCRIPTION OF SYSTEM OF FIG. 1

Figure 1:
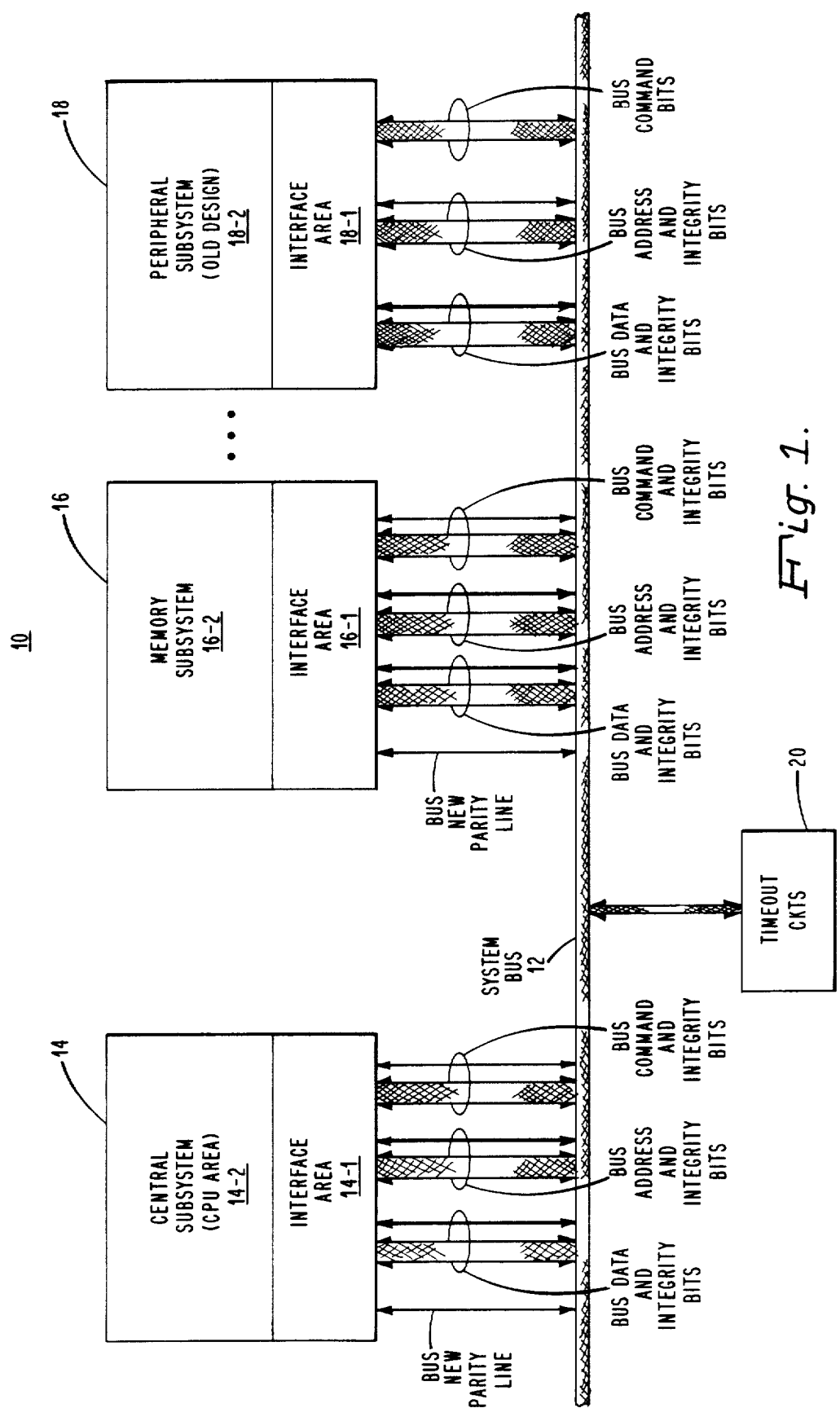
FIG. 1 is a block diagram of a system which includes the apparatus of the present invention.

FIG. 1 shows a data processing system 10 which includes a plurality of subsystems 14 through 18 of old and new designs which couple in common to a system bus 12. The illustrative subsystms include a central subsystem 14, a memory subsystem 16 and a peripheral subsystem 18. Each subsystem includes an interface area which enables the unit or units associated therewith to transmit or receive requests in the form of commands interrupts, data or responses/status to another unit on system bus 12 in an asynchronous manner.

It is assumed that only subsystems 14 and 16 are new in design and incorporate the apparatus of the present invention in their interface areas 14-1 and 16-1, respectively. The peripheral subsystem 18 is assumed to be designed for inclusion in an earlier system, such as the system disclosed in U.S. Pat. No. 3,995,258, entitled "Data Processing System Having a Data Integrity Technique", invented by George J. Barlow. Hence, its interface area 18-1 does not include the apparatus of the present invention but connects to system bus 12 and operates as in the earlier system as explained herein. Interface area 18-1 includes bus interface logic circuits disclosed in FIG. 9 of U.S. Pat. No. 3,995,258.

By way of illustration, only three subssytems are shown in FIG. 1. However, data processing system 10 normally includes additional subsystems of both new and old designs for connecting a full complement of peripheral devices, other processing units and communication devices to system bus 12. In addition to these subsystems, system 10 includes timer apparatus which takes the form of timeout logic circuits of block 20. As shown, these circuits couple to system bus 12 and operate to generate a signal after a predetermined period of time, such as five microseconds, which in turn produces a negative acknowledgement response signal on system bus 12 as explained herein.

As mentioned above, each of the interface areas 14-1 and 16-1 includes the apparatus of the present invention. Except as stated herein, both of these interface areas can be considered equivalent in design. Therefore, only interface area 14-1 is described in detail herein with reference to FIG. 2.

GENERAL DESCRIPTION OF INTERFACE AREA 14-1

Figure 2:
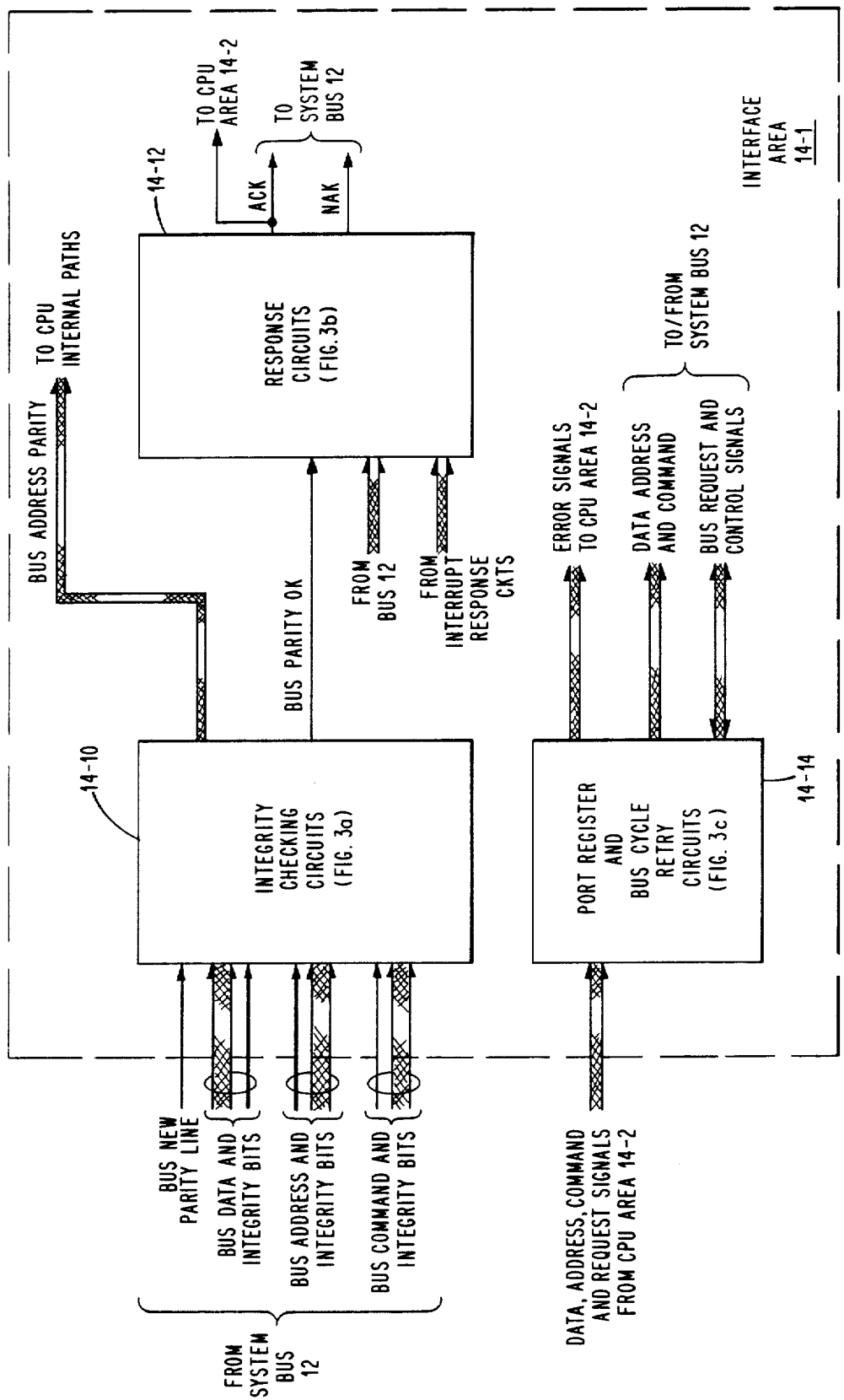
FIG. 2 shows in greater detail, the central subsystem of FIG. 1.

Referring to FIG. 2, it is seen that the interface area 14-1 includes the integrity checking circuits of block 14-10, the response circuits of block 14-14. As shown, the circuits of block 14-10 couple to system bus 12 and receive as inputs all of the signals applied to the different portions of system bus 12. These include a bus new parity line, a 36-bit wide data portion, a 27-bit wide address portion and a 9-bit wide command portion. The circuits of block 14-10 generate a bus OK parity signal indicating whether or not parts of a request applied to bus 12 are valid. Additionally, in the case of requests received from older subsystems (e.g. subsystem 18), block 14-10 provides a bus address parity signal for distribution within the central processing unit (CPU) area 14-2 as explained herein. The bus parity OK signal is applied as an input to the response circuits of block 14-12. These circuits operate to generate on bus 12 several types of responses. One is an acknowledgement (ACK) response indicating that a valid request was received. Another is a negative acknowledgement (NAK) response indicating that the request could not be processed at that time. A third type of response is no response which produces a timeout condition and causes a retry of the request as explained herein.

Additionally, the response circuits of block 14-12 receive signals from bus 12 indicative of the type of bus cycle being performed and signals from interrupt response circuits, not sohwn, indicating whether or not the interrupt level of the requestor is sufficient to be accepted, as explained herein.

The port registers and bus retry circuits of block 14-14 couple to system bus 12. The block 14-14 stores address, data and command portions of each request received from CPU area 14-2 for subsequent transfer to system bus 12. Additionally, block 14-14 includes circuits for retrying a request on system bus 12 when the request is not verified by the receiving unit, as explained herein.

DETAILED DESCRIPTION OF INTERFACE AREA 14-1

Figure 3A:
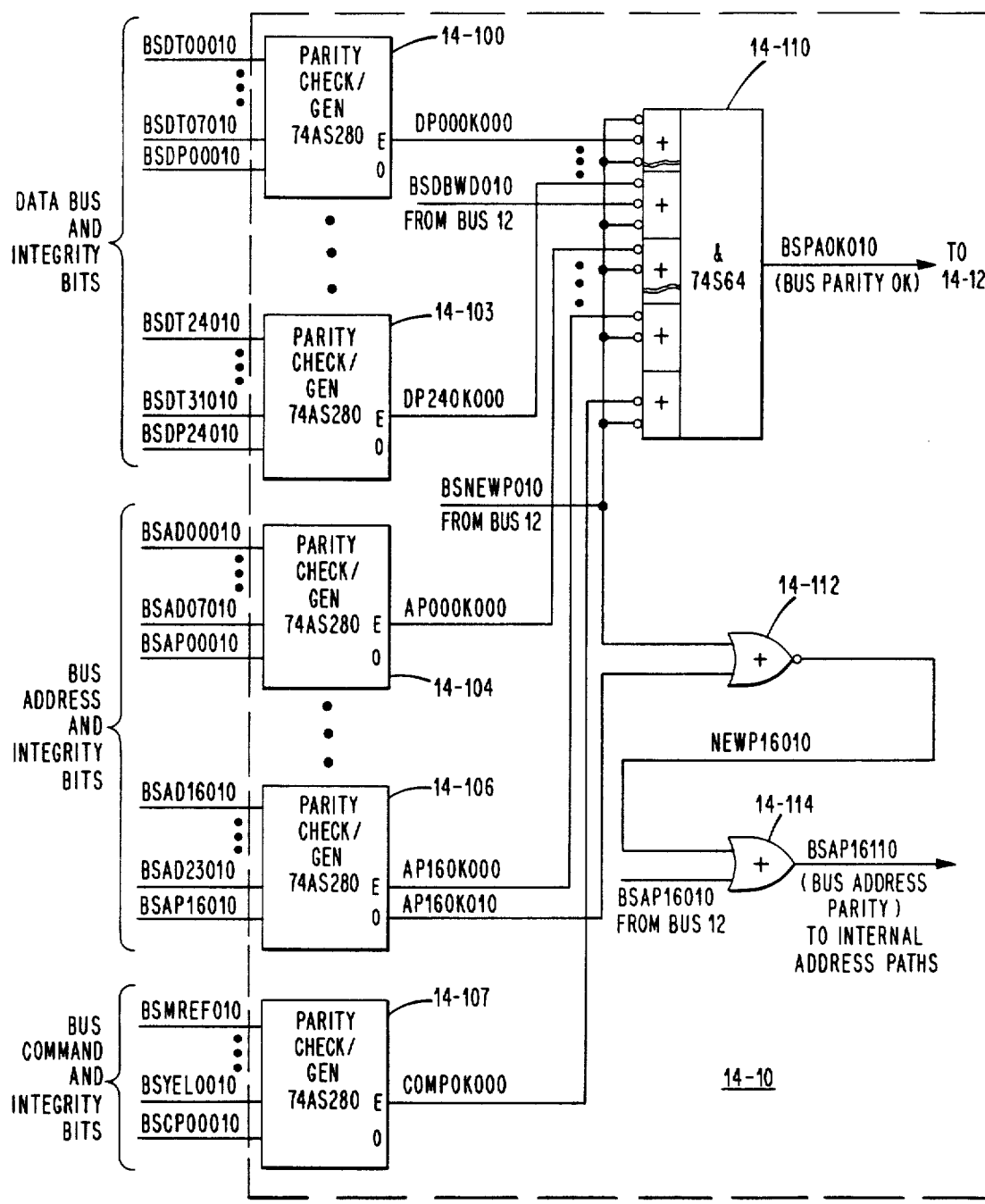
FIGS. 3a through 3c show in greater detail, the central subsystem interface area of FIG. 2.

FIG. 3a shows in greater detail, the integrity checking circuits of block 14-10. As shown, these circuits include three groups of parity check and generator circuits constructed from conventional chips such as the 74AS280 manufactured by Texas Instruments Corporation. The first group of 74AS280 chip circuits 14-100 through 14-103 generate data parity check signals DP000K000 through DP240K000 at their even (E)

output terminals for the 32 data bit signals BSDT00010 through BSDT31010 and four parity integrity data bit signals BSDP00010 through BSDP24010.

The next group of 74AS280 chip circuits 14-104 through 14-106 generate address parity check signals AP000K000 through AP160K000 at their even output terminals for the 24 address bit signals BSAD00010 through BSAD23010 and three parity integrity address bit signals BSAP00010 through BSAP16010. A last 74AS280 chip circuit 14-107 generates command parity check signal COMPOK000 at its even output terminal for the eight command bit signals BSMREF000 through BSYEL0010 and parity integrity command bit signal BSCP00010.

Each of the data parity check signals DP000K000 through DP240K000 is combined with a bus new parity signal BSNEWP010 and a bus double wide signal BSDBWD010 in the case of last two check signals within NAND/AND (i.e., positive logic) or AND/NOR (i.e., negative logic) gate circuits 14-110 constructed from conventional chips such as 74S64 manufactured by Texas Instruments Corporation. Similarly, each of the address parity check signals AP000K000 through AP160K000 is combined within bus new parity signal BSNEWP010 within NAND/AND gate circuits 14-110. Lastly, the command parity check signal COMPOK000 is combined with new bus parity signal BSNEWP010 within NAND/AND gate circuits 14-110.

Whenever any one of the parity check signals at the even output terminals is a binary ONE, this signals an error in the part of the request being received from system bus 12. The result is that one of the NAND/AND circuits of circuits 14-110 receiving the binary ONE applies a binary ZERO as an input to the AND gate part of circuits 14-110 forcing bus parity OK signal BSPAOK010 to a binary ZERO.

Because the subsystems of FIG. 1 include both new and old subsystems, bus new parity signal BSNEWP010 is used to differentiate between these two types of subsystems. As mentioned above, only the new subsystems provide full integrity checking of requests before acceptance. Accordingly, each such subsystem operates to force signal BSNEWP010 to a binary ONE. In the case of an older subsystem, the bus new parity line is absent. Hence, signal BSNEWP010 remains a binary ZERO. This effectively disables the checking circuits by causing circuits 14-110 to automatically force bus parity OK signal BSPAOK010 to a binary ONE.

The state of bus double wide line is used to signal whether or not the request includes a transfer of all 32 data bits by a subsystem that has a double wide data path. That is, when signal BSDBWD010 is a binary ONE indicative of a 32-bit double wide data transfer, the circuits 14-110 are conditioned to verify the integrity of all 32 bits. When signal BSDBWD010 is a binary ZERO indicative of a transfer of 16 data bits, circuits 14-110 are effectively disabled from performing a check of data bits 16-31 (i.e., cause their NAND circuits to apply binary ONE input signals to the AND portion of circuits 14-110).

Additionally, the integrity checking circuits of block 14-10 further include series connected NOR gate 14-112 and OR gate 14-114. NOR gate 14-112 combines bus new parity signal BSNEP010 and address check parity signal AP160K010 from the odd output terminal of parity check/generator circuit 14-106. The arrangement recognizes that older subsystems will not transmit new address integrity signals on system bus 12. Thus, the integrity signal BSAP16010 received by the integrity checking circuits 14-10 will be a binary ZERO. Since the binary ZERO state of signal BASP16010 received from system bus 12 is guaranteed, ORing this signal with signal NEWP16010 from NOR gate 14-112 provides good parity in the form of signal BSAP16110 to the internal address paths of central subsystem 14-2.

In this instance, parity circuit 14-106 functions as a parity generator in providing odd parity for address bit signals BSAD16010-23010. Here, bus new parity signal BSNEWP010 is a binary ZERO causing signal BSAP16110 assumes the state of parity signal AP160K010. When bus new parity signal BSNEP010 indicative of a request from a new subsystem, signal BSAP16100 assumes the state of the address integrity signal BSAP16010 from system bus 12. By timesharing circuit 14-106 in this manner, good parity signals are transferred to subsystem address paths in the case of both new and older subsystem requests. Although not shown, it may be assumed that each of the odd parity signals AP080K010 and COMPOK010 is combined with signal BSNEWP010 in the same manner as described above.

Additionally, bus parity OK signal BSPAOK010 is also applies as an input to the second half bus cycle response circuits, not shown, of the interface area 14-1. It is only when signal BSAOK010 is a binary ONE, is a second half bus cycle response flip-flop allowed to be set to a binary ONE state which permits a response as explained herein.

RESPONSE CIRCUITS OF BLOCK 14-12

Figure 3B:
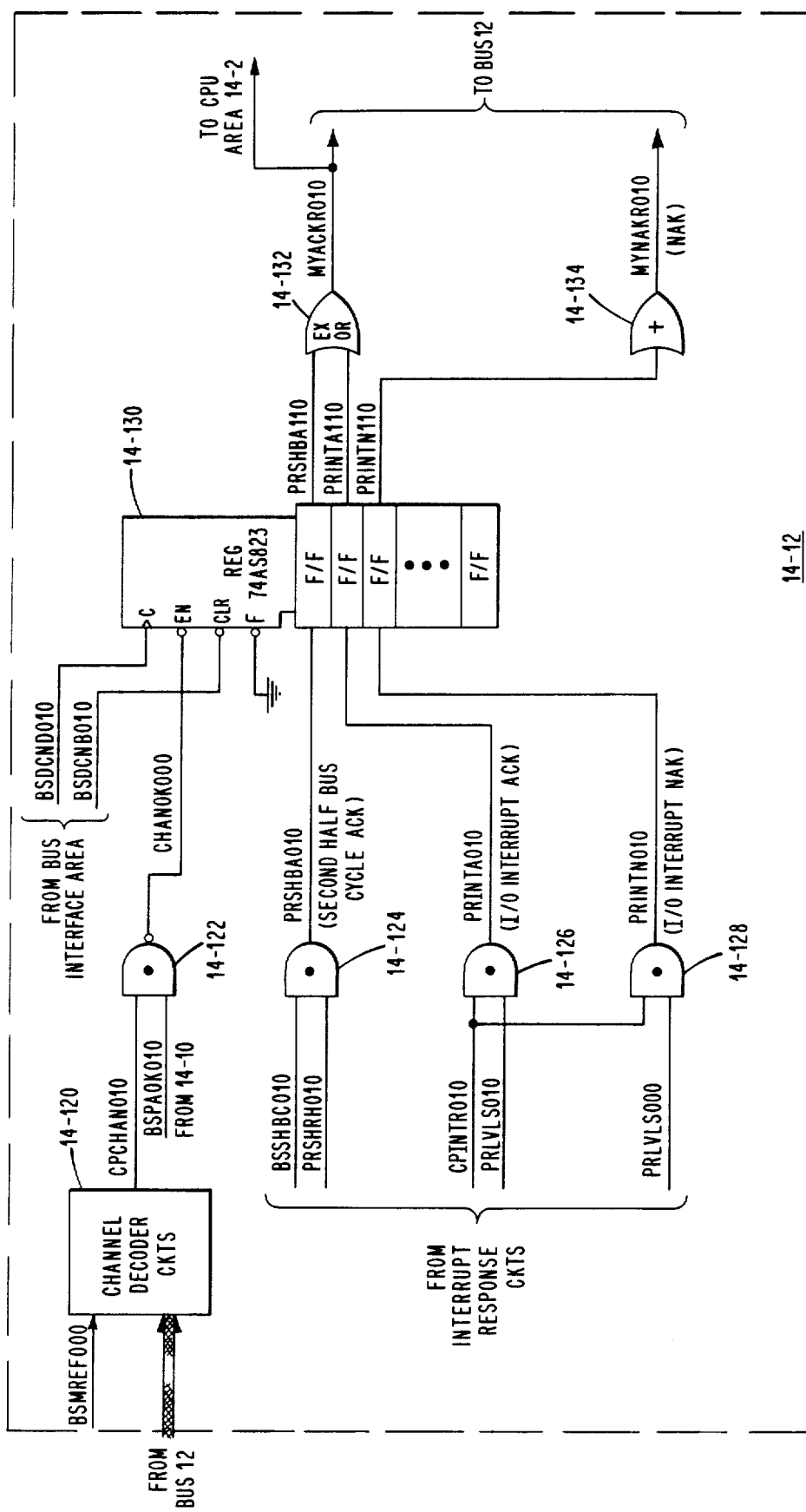

Only the new subsystems of FIG. 1 include circuits equivalent to those of block 14-12. As shown in FIG. 3b, the circuits of block 14-12 include channel decoder circuits 14-120, a NAND gate 14-122, a plurality of AND gates 14-124 through 14-128, a 9-bit register 14-130, an output exclusive OR gate circuit 14-132 and OR gate 14-134 connected as shown. The gates and register are conventional in design. For example, register 14-130 may be constructed from a 74AS823 chip circuit manufactured by Texas Instruments Corporation.

The circuits of block 14-120 operate to detect when the unique channel number assigned to central subsystem 14-2 is applied to system bus 12. These circuits include comparison circuits which compare the received channel number with an internally stored channel number and force CP channel signal CPCHAN010 to a binary ONE upon detecting an identical comparison therebetween. NAND gate 14-122 combines signal CPCHAN010 and bus parity signal BSPAOK010 to produce channel OK signal CHANOK000. It forces signal CHANOK000 to a binary ZERO when the integrity checking circuits 14-10 have verified that all of the parts of the request received by central subsystem 14 are valid. This, in turn, enables register 14-130 for storing the states of signals PRSHBA010, PRINTA010 and PRINTN010 in response to bus data cycle now delayed signal BSDCND010. This signal defines the interval of time during which the addresses subsystem (slave) will have been able to detect its channel address. For further discussion, reference may be made to U.S. Pat. No. 3,995,258. The signals PRSHBA010 through PRINTN010 identify the type of bus cycle being performed and are used to generate either an acknowledgement or negative acknowledgement response signal. In greater detail, AND gate combines second half bus cycle signal BSSHBC010 and processor second half read history signal PRSHRH010 to produce second half bus cycle acknowledgement signal PRSHBA010.

The second half bus cycle is the interval during which previously requested information is transferred to the requesting subsystem. It is the second cycle of a two cycle operation, such as a read operation.

Signal BSSHBC010 is received from system bus 12 when the subsystem (e.g. memory subsystem 16 is transferring the data previously requested by central subsystem 14. Signal PRSHRH010 is normally a binary ONE and ensures that central subsystem 14 acknowledges second half bus cycles of only those requests it initiates.

AND gates 14-126 and 14-128 combine CPU interrupt signal CPINTR010 and complementary processor level signals PRLVLS010 and PRLVLS000 to produce I/O interrupt acknowledgement and negative acknowledgement signals PRINTA010 and PRINTN010. The CPU interrupt signal CPINTR010 and processor level signal PRLVLS010 when both binary ONES indicating that the interrupting subsystem has a higher priority than the current operating level (i.e., level number value is less) causes AND gate 14-126 to force acknowledgement signal PRINTA010 to a binary ONE. At that time, complementary processor level signal PRLVLS000 is a binary ZERO. However, when processor level signal PRLVLS000 is a binary ONE indicating that the interrupting subsystem has a lower priority than the current operating level, AND gate 14-128 forces negative acknowledgement signal PRINTN010 to a binary ONE.

The acknowledgement signals PRSHBA110 and PRINTA110 are combined within exclusive OR gate 14-132 for checking purposes so that my acknowledgement signal MYACKR010 is generated when only one of the acknowledgement signals is a binary ONE. The negative acknowledgement signal PRINTN110 when a binary ONE causes OR gate 14-134 to force my negative acknowledgement signal MYNAKR010 to a binary ONE. As seen from FIG. 3b, signals MYACKR010 and MYNAKR010 are applied to system bus 12 via conventional dirver circuits, not shown.

As discussed above, memory subsystem interface area 16-1 includes similarly constructed response circuits with one exception. The memory response circuits include circuits for generating a wait response. This requires another AND gate which receives the same signals as AND gate 14-124. However, one of two complementary signals indicating the busy status of the memory is applied to an appropriate one of these AND gates.

PORT REGISTERS AND BUS RETRY CIRCUITS

Figure 3C:
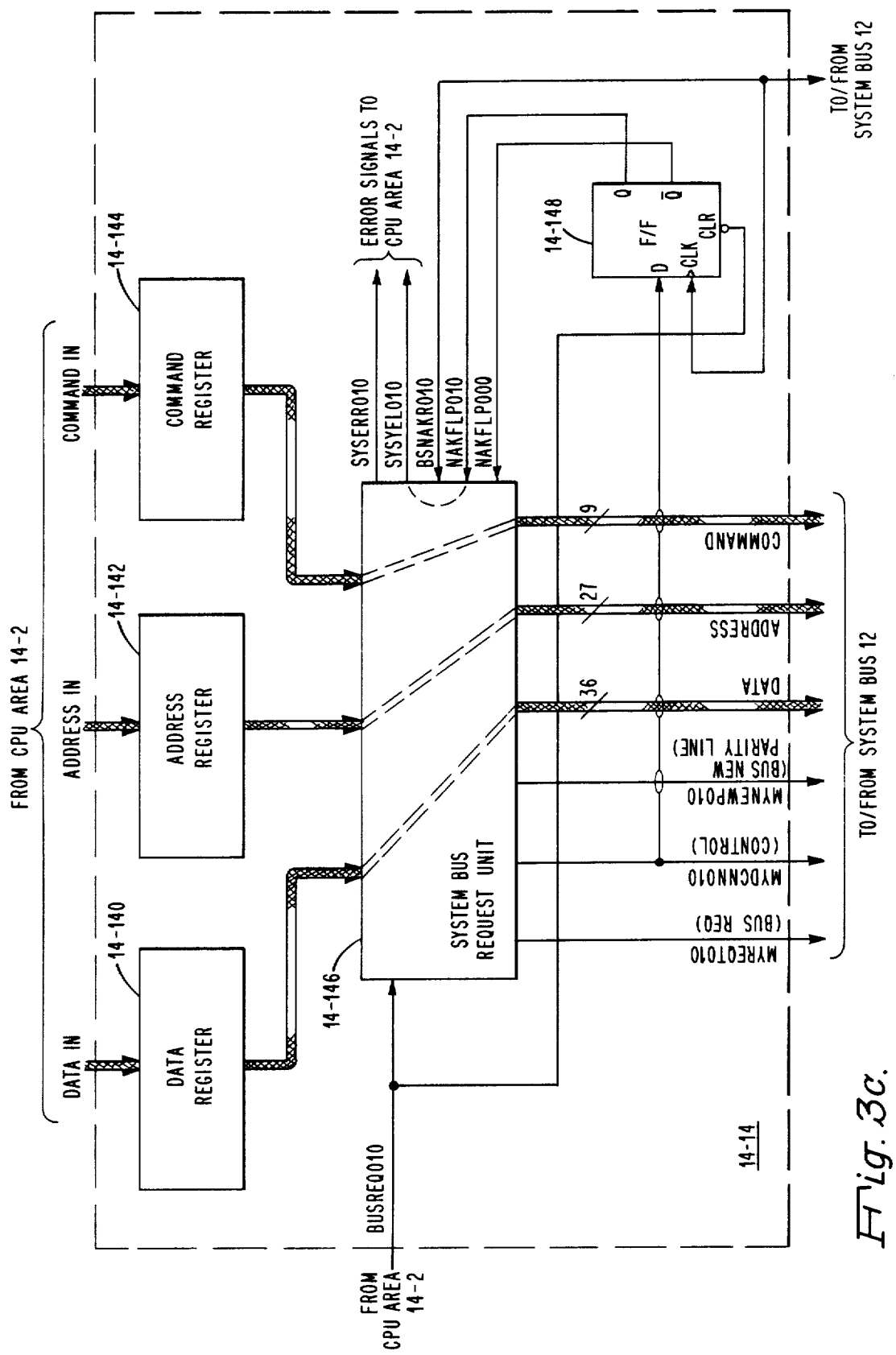

FIG. 3c shows in greater detail, the port registers and retry circuits of block 14-14 of FIG. 2. As shown, block 14-14 includes a plurality of registers 14-140, 14-142 and 14-144 which store the data, address, command and integrity bits of a request generated by central processing unit area 14-2. The contents of these registers are applied via a system request unit 14-146 and driver circuits, not shown, to the data, address and command portions of system bus 12.

Also, my new parity signal MYNEWP010 is forced to a binary ONE which in turn causes bus new parity line to be forced to a binary ONE. All of the signals of the request are gated onto system bus 12 with my data cycle now signal MYDCNN010. At that time, system request unit 14-146 operates to force my request signal MYREQT010 to a binary ONE signalling a receiving subsystem of the request. Signal MYREQT010 is generated according to the following Boolean equation:

$$MYREQT010 = BUSREQ010 = (MYDCNN010 \cdot NAKFLP000 \cdot BSNAKR010).$$

The second half of the equation pertains to generating my request signal MYREQT010 for retrying any request which was not accepted by a receiving subsystem as explained herein. In addition to unit 14-146, the retry circuits further include a D-type flip-flop 14-148. The flip-flop 14-148 is held in a binary ZERO state when CPU area 14-2 is not issuing a bus request (i.e., signal BUSREQ010 is a binary ZERO). The flip-flop 14-148 is permitted to switch to a binary ONE state when signal BUSREQ010 is switched from a binary ZERO to a binary ONE according to the following equation:

$$SET = MYDCNN010 \cdot BSNAKR010.$$

Thus, it stores the fact that a negative acknowledgement was received from system bus 12.

In response to signal NAKFLP010 being forced to a binary ONE, system bus request unit 14-146 forces a system yellow signal SYSYEL010 to a binary ONE (i.e., SYSEL010 = NAKFLP010·TIMOUT010). Also, unit 14-146 forces a system error signal SYSERR010 to a binary ONE according to the following Boolean equation:

$$SYSERR010 = MYDCNN010 \cdot NAKFLP010 \cdot B \cdot SNAKR010 \cdot TIMOUT010.$$

Both of these signals are forwarded to the CPU area 14-2 for action as explained herein.

The signal TIMOUT010 is generated by timeout circuits, conventional in design included within block 14-146. These circuits force signal TIMOUT 010 to a binary ONE when they detect that signal MYDCNN010 has remained at a binary ONE for a predetermined period of time which corresponds to three microseconds.

DESCRIPTION OF OPERATION

With reference to flow diagrams of FIG. 4a and 4b, the operation of interface area 14-1 will now be described relative to processing the requests of FIG. 5. It is assumed that central subsystem 14 desires to write or read data from memory subsystem 16. In such case, subsystem 14 operates to generate a memory request having the format of FIG. 5a or 5b. That is, subsystem 14-2 loads the data, address, command and integrity bits into registers 14-140 through 14-144. Additionally, system bus request unit 14-146 forces signal MYNEWP010 to a binary ONE. Also, it forces bus request signal BUSREQ010 to a binary ONE. This results in my request signal MYREQT010 being forced to a binary ONE and the clearing of flip-flop 14-148 to a binary ZERO.

Signal MYREQT010 forces a bus request line BSREQT to a binary ONE signalling that subsystem 14 is requesting a bus cycle. For a memory request, the command bits are set as follows: BSMREF010=1; BSWRIT010=0=(read) or BSWRIT010=1=(write); BSLOCK010=0; BSSHBC010=0; BSDBWD010=1; BSBYTE010=0; BSDBPL010=1, and BSYEO010=0.

When subsystem has been granted a bus cycle in response to signal BUSREQ010, signal MYDCNN010 is forced to a binary ONE by priority network circuits included within unit 14-146. These circuits are conventional in design and may take the form of the circuits disclosed in U.S. Pat. No. 3,995,258. At that time, the memory request together with new bus parity signal MYNEWP010 are applied to system bus 12.

As seen from FIG. 4b, memory subsystem area 16-1 operates to sense the request from system bus 12. This is done by channel decoder circuits similar to those of block 14-120 detecting the memory subsystem's channel address and detecting that bus memory reference command bit BSMREF is a binary ONE. Next, memory subsystem determines the state of bus new parity line which establishes whether or not all of the new integrity checks will be performed. Since signal BSNEWP010 is a binary ONE, circuits identical to those of FIG. 3a operate to perform an integrity chech on each part of the memory request. When any part of the request cannot be verified as valid, the integrity check circuits operate to force bus parity OR signal to a binary ZERO.

As seen from FIG. 4b, this causes the memory subsystem 16 to inhibit the generation of a response. That is, circuits similar to those of FIG. 3c, force channel OK signals CHANOK000 to a binary ONE inhibiting the generation of any response.

Now, the time out circuits of block 20 started a timing interval in response to the generation of my data cycle now signal MYDCNN010 by system response unit 14-146 of FIG. 3c. Because memory subsystem 16 fails to generate any response (acknowledgement, wait or negative acknowledgement), the circuits of block 20 at theend of a five microsecond interval generate a negative acknowledgement signal. This results in signal BSNAKR010 flip-flop 14-148 of FIG. 3c to a binary ONE.

As seen from FIG. 4a, central subsystem 14 upon detecting having not received a response and that a bus timeout occurred, determines whether or not this is the first time that the request is to be retried. This is defined by the state of flip-flop 14-148. That is, when the flip-flop 14-148 is in a binary ZERO state, the receipt of negative acknowledgement signal BSNAKR010 at the end of the bus cycle causes my request signal MYREQT010 to be switched again to a binary ONE. At that time, my data cycle now signal MYDCNN010 is still a binary ONE.

When central subsystem 14 is again granted access to system bus 12, my data cycle now signal MYDCNN010 is again switched to a binary ONE. This again applied the request contents of registers 14-140 through 14-144 together with new parity line signal MYNEWP010 to system bus 12. Again, the operations of FIGS. 4a and 4b are performed by subsystems 14 and 16.

It will be noted that negative acknowledgement signal BSNAKR010 causes flip-flop 14-148 to switch to a binary ONE (i.e., set=MYDCNN010·BSNAKR010). This, in turn, forces error signal SYSYEL010 to a binary ONE when internally generated timeout signal TIMOUT010 is a binary ONE. This signals central processing unit area 14-2 of the occurrence of the bus error and resulting first retry operation.

As seen from FIG. 4a, in the event that the retry operation is not successful, the timeout circuits of block 20 operate to generate a second negative acknowledgement signal. This causes the system bus request unit 14-146 to force system error signal SYSERR010 to a binary ONE. Since this is the second retry, central subsystem 14 operates to about the request and report the unsuccessful retry error condition. Since the condition which produced the error could not be remedied by retrying the request once, it is viewed by the system as a solid failure.

As seen from FIG. 4b, when the retried request is completely verified by memory subsystem 16, then the memory subsystem integrity checking circuits operate to force bus parity OK signal BSPAK010 to a binary ONE state. This, in turn, permits the memory subsystem response circuits to generate an acknowledgement response signal as indicated in FIG. 4b. Only after such verification, is memory subsystem 16 permitted to accept and process the request. That is, positive acknowledgement signal MYACKR010 enables the request from system bus 12 to be loaded into the queue register of the memory subsystem. For further information regarding how this is accomplished, reference may be made to U.S. Pat. No. 4,451,880, titled "Memory Controller with Interleaved Queuing Apparatus". Thus, the possibility of damage to memory information or the initiation of invalid operation has been eliminated.

As seen from FIG. 5a, a memory write request requires only one bus cycle of operation. However, a memory read request requires two bus cycles of operation. The first bus cycle is performed in the same manner for both memory read and memory write requests. During a subsequent second bus cycle, the memory subsystem 16 transfers the requested data to central subsystem 14. Here, memory subsystem 16 performs the sequence of operations of FIG. 4a. As seen from FIG. 5c, subsystem 16 applies the channel number of central subsystem 14, a constant value K and associated integrity bits to the address portion of system bus 12. The data and integrity bits are applied to the data portion of system bus 12 while the command and integrity bits are applied to the command portion of system bus 12. Also, the system response unit of memory subsystem 16 forces new parity line signal (e.g. MYNEWP010) to a binary ONE.

Now, central subystem 14, as the receiving unit, (slave) performs the sequence of operations of FIG. 4b. Briefly, the integrity circuits of block 14-10 perform a check of each part of the information received from system bus 2. As seen from FIG. 3b, in the absence of bus parity OK signal BSPAOK010 being forced to a binary ONE, the response circuits of block 14-12 are inhibited from generating a response. As previously discussed, this causes the timeout circuits of block 20 to generate a negative acknowledgement signal. As seen from FIG. 4b, this causes memory subsystem 16 to retry the same transfer of information during a subsequent cycle of operation. If the retry is successful, the central subsystem response circuits of block 14-12 are operative to generate an acknowledgement signal indicating acceptance which completes the memory operation. The acknowledgement signal causes the request to be stored in an input register (e.g. FIFO, buffer, queue).

When the retry is unsuccessful, the memory subsystem operates to signal the occurrence of an uncorrectable error condition via system bus 12 or by other conventional means. It will be noted that for ease of implementation and design simplicity, the retry circuits of block 14-146 will retry all requests issued by CPU area 14-2 which result in the receipt of a negative acknowledgement response.

FIGS. 5d and 5e illustrate the formats of an I/O read request and I/O read request response. This type of request and response is processed by a peripheral subsystem in the same manner as the memory read request was processed by memory subsystem 16. The function code is used to specify the particular I/O operation to be performed. It is presumed that the peripheral subsystem is constructed to include the integrity checking and retry apparatus of the present invention.

FIG. 5f illustrates the format of an interrupt request. A subsystem desiring to interrupt the central subsystem 14 requests a bus cycle. When the bus cycle is granted, the subsystem places the channel number of central subsystem 14 on the address portion of system bus 12 and its own channel number and level number on the data portion of system bus 12. That is, the interrupting subsystem performs the series of operations of FIG. 4a while central subsystem 14 performs the series of operations of FIG. 4b.

In the same manner as previously described, the central subsystem integrity checking circuits of block 14-10 operate to verify all parts of the interrupt request. When so verified, bus parity OK signal BSPAOK010 is forced to a binary ONE. As seen from FIG. 3b, this enables register 14-130 to be loaded with the states of signals PRSHBA010, PRINTA010 and PRINTN010. Since this is an interrupt request, second half bus cycle acknowledgement signal PRSHBA010 is a binary ZERO. The central subsystem 14 accepts the interrupt request by forcing interrupt acknowledge signal PRINTA010 to a binary ONE when the level number presented by the interrupting subsystem is numerically smaller than the current internal level. However, when the present level number is not numerically smaller than the current internal level, central subsystem indicates that it cannot accept the interrupt by forcing interrupt negative acknowledgement signal PRINTN010 to a binary ONE. As seen from FIG. 4a, in the absence of a response from central subsystem 14, the interrupting subsystem operates to retry the interrupt request. If retry is successful, operation continues. However, if retry is unsuccessful, the interrupting subsystem signals the error condition to the central subsystem 14.

As seen from FIG. 4b, the integrity checking circuits of the present invention also operate to process requests received from older subsystems which do not include the integrity checking features of the present invention. That is, when the request received and bus new parity signal BSNEWP010 is a binary ZERO, the circuits of block 14-10 of FIG. 3a force bus parity OK signal BSPAOK010 to a binary ONE. The valid parity signals generated by parity generator circuit 14-106 and other such circuits are applied to the subsystem internal address paths. This provides added system integrity within essentially no additional circuits.

Summarizing the above, it is seen how subsystems which include the integrity checking bus and retry circuits of the present invention are able to determine at the earliest possible time whether or not a request has been properly received by a subsystem. By placing the burden of request verification on the unit initiating the request (master) or stated differently, the unit allocated the bus cycle, the system can reliably make such determinations and take the desired corrective action before any damage occurs. This provides a high degree of system resiliency while still maintaining a high degree of integrity. It will be noted that the same degree of integrity is employed in the handling of any type of bus request.

While the several examples described pertained to requests requiring one or two bus cycles, the invention operates in the same fashion in processing requests having any number of cycles (e.g. burst requests, double pull requests). Also, the present invention is in no way limited to any particular request format. For additional examples of formats, reference may be made to the publication entitled "Level 6 Minicomputers MODELS 6/34, 6/36 and 6/42", Order No. AS22, Rev. 3, dated May, 1979, Copyright 1979 Honeywell Information Systems Inc.

It will also be noted that for any system in which all subsystems include the integrity checking and retry circuits of the present invention, there will be no need to include the bus new parity line. Also, many changes may be made to the integrity checking and response circuits of the present embodiment for accommodating different types of subsystems. The present embodiment is only illustrative of the type of circuits required for including the integrity and resiliency features of the present invention as part of a bus system of a processing system.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A system including a plurality of units coupled in common to a system bus for transferring requests between said plurality of units during different allocated bus cycles of operation, each request being transferred during a number of said allocated bus cycles of operation, said system further including:

means included in at least one of said plurality of units for generating requests on said bus, each request containing a number of different parts, said parts each containing a number of integrity bits for verifying when said request is validly received by another unit of said plurality of units designated by said request during each of said number of allocated bus cycles of operation and at least one of said parts being coded to specify an operation to be performed by said another unit;

checking means included in said another unit, said checking means being coupled to said bus for verifying during each allocated bus cycle of operation that all of said number of different parts of said each request received from said bus by said checking means of said another unit are valid;

response means included in said another unit, said response means being coupled to said checking means and to said bus, said response means being inhibited by said checking means from generating any response on said bus to said one unit signalling acceptance of said request when said checking means verifies that less than all of said parts of said received request received during said each allocated bus cycle of operation are valid; and, means for accepting said request, said means for accepting being coupled to said bus and to said response means, said means for accepting being enabled to accept said request from said bus during each of said allocated bus cycles of operation upon said response means signalling said acceptance of said request and said means for accepting, rejecting said request applied to said bus during each of said allocated bus cycles of operation when said response means is inhibited from generating any response on said bus thereby ensuring that said another unit does not attempt to perform any operation specified by an invalid request.

2. The system of claim 1 wherein said system further includes timeout means coupled to said system bus, said timeout means being operative in the absence of any response from said another unit to generate a predetermined signal on said bus after a predetermined period of time indicating that said another unit has not accepted said request and said one unit further including retry means coupled to said system bus, said retry means in response to said signal causing said generating means to retry said request on said system bus during a subsequent bus cycle of operation.

3. The system of claim 2 wherein said one unit further includes indicator means coupled to said bus and to said retry means, said retry means causing said indicator means in response to said predetermined signal from said bus to generate a first error signal signifying to said one unit the occurrence of a first retry operation.

4. The system of claim 3 wherein said one unit further includes error means coupled to said indicator means and to said retry means, said indicator means causing said error means in response to a second occurrence of said predetermined signal to generate a second error signal signifying that said first retry operation performed by said retry means was unsuccessful and that further processing of said request is to be aborted by said one unit.

5. The system of claim 1 wherein said system bus includes a plurality of lines which are grouped into a plurality of groups, each group being arranged for receiving at least one predetermined part including at least one of said number of integrity bits of each said request during each of a number of bus cycles of operation.

6. The system of claim 5 wherein said plurality of groups include a multibit address bus group, a multibit data bus group and a multibit command bus group for receiving address, data and command bits respectively including said number of integrity bits of each request during each of said number of bus cycles of operation.

7. A system including a plurality of units of new and old designs coupled in common to a system bus for transferring requests between designated ones of said plurality of units during different asynchronously generated bus cycles of operation, said system further including:

first means included in at least a first unit of said plurality of units of said new design for generating requests on said bus, each request containing a number of different parts, each of said parts containing at least one integrity bit for verifying that said request is validly received by a second cycle of operation;

said system bus including a new parity line coupled only to each of said units of new design;

second means included in said first unit of said new design for applying a predetermined signal to said new parity line which identifies to a second one of said plurality of units said new design receiving said request that said request includes all integrity bits required for verifying that all of said number of parts of said request are valid;

checking means included in each of said plurality of units of said new design, said checking means of each of said units of new design being coupled to said new parity line and operative in response to said predetermined signal to verify that all of said number of different parts of said request designating said unit received from said bus by said unit are valid; and, response means included in each of said plurality of units of said new design and in each of said units of said old design, said response means of each of said units of said new design being coupled to said checking means associated therewith and to said bus, said response means of each of said units of said new design when designated by said request being inhibited by said checking means from generating any response to said request on said bus to said first unit when less than all of said parts of said received request are valid and said response means of each of said units of said old designs when designated by said request generating a response on said bus to said first unit subsequent to receiving said request in the same manner as said response would have been generated in a system which included only units of said old design.

8. The system of claim 7 wherein said checking means of each unit of said new design is operative in the absence of said predetermined signal to perform a checking operation on less than all of said parts of said received request and said response means of said each unit of said new design being conditioned by said checking means as a result of such checking operation to generate a type of acknowledgement response to one of said units of said old design which transmitted said received request, which is the same as would have been generated in a system, which included only said units of said old design.

9. The system of claim 7 wherein said response means of each unit of said new design is conditioned by said checking means when all of said parts of said received request are valid to generate a predetermined response to said first unit of said new design signalling that said request has been validly received.

10. The system of claim 9 wherein each of said units of said new design include connector means for applying said number of said integrity bits to said bus in a predetermined manner for enabling each of said units of said old design coupled to said bus to disregard said integrity bits and perform a check only those parts of said received request verified in said system designed to include only units of said old design.

11. The system of claim 7 wherein said system further includes timeout means coupled to said system bus, said timeout means being operative in the absence of any respnse from said another unit to generate a predetermined signal on said bus after a predetermined period of time indicating that said another unit has not accepted said request and said first unit further including retry means coupled to said system bus, said retry means in response to said signal causing said generating means to retry said request on said system bus during a subsequent bus cycle of operation.

12. The system of claim 11 wherein said first unit of said new design further includes indicator means coupled to said retry means, said retry means causing said indicator means in response to said predetermined signal from said bus to generate a first error signal signifying to said one unit the performance of a first retry operation.

13. The system of claim 12 wherein said first unit of said new design further includes error means coupled to said indicator means and said retry means, said indicator means causing said error means in response to a second occurrence of said predetermined signal to generate a second error signal signifying that said first retry operation performed by said retry means was unsuccessful and that said request is to be aborted by said first unit.

14. The system of claim 7 wherein said system bus includes a plurality of lines which are grouped into a plurality of groups, each group being arranged for receiving at least one predetermined part including at least one of said number of integrity bits of each of said request during each of a number of bus cycles of operation.

15. The system of claim 14 wherein said plurality of groups include a multibit address bus group, a multibit data bus group and a multibit command bus group for receiving address, data and command bits respectively including said number of integrity bits of each request during each of said number of bus cycles of operation.

16. The system of claim 8 wherein said checking means includes means which generates integrity bits for all of said parts of said received requests during said checking operation and each unit of said new design further including a number of internal paths and transfer means coupled to said internal paths, to said checking means, to said new parity line and to said system bus, said transfer means being operative to transfer to said internal paths within said each unit of said new design, said integrity bits generated by said checking means for those parts of said request received from said unit of said old design which did not contain integrity bits for enabling subsequent internal checking.

17. A method of operating a bus system in a resilient manner when transferring requests during different allocated bus cycles of operation between a plurality of data handling units coupled in common to said bus system, each request being transferred during a number of said allocated bus cycles of operation, said method comprising the steps of:
(a) generating requests on said bus system by means included in at least one of said data handling units, said each request containing a number of different parts, said parts each containing a number of integrity bits for verifying when said request is validly received by another unit designated by said request of said plurality of units during each of said number of allocated bus cycles of operation and at least one of said parts being coded to specify an operation to be performed by said another unit;
(b) checking by checking means included in at least another one of said data handling units, to verify that all of said number of different parts of said each request received by said another data handling unit from said bus during each allocated bus cycle of operation are valid;
(c) generating a response on said bus by response means included in said another one of said data handling units when enabled by said checking means;
(d) enabling said response means for generating a response on said bus only when all of said parts of said request received during said each allocated bus cycle of operation are signalled by said checking means as being valid;
accepting said request from said bus during each allocated bus cycle of operation when a response is generated signalling the receipt of a valid request; and,
rejecting the request applied to said bus during each allocated bus cycle of operation when no response is generated signalling the receipt of an invalid request thereby ensuring that said another one of said data handling units does not attempt to perform any operation specified by an invalid request.

18. The method of claim 17 wherein said method further includes the steps of:
(d) generating a signal by timeout means connected to said bus system in the absence of said response for signalling to the unit which transmitted a request the occurrence of a bad bus cycle of operation in which the said designated receiving unit had not accepted the request because it was invalid; and,
(e) retrying said request on said bus during another allocated bus cycle of operation by retry means included within such transmitting unit and which couples to said bus system.

19. The method of claim 17 wherein said method of operating said resilient bus system further includes the steps of:
generating a predetermined signal on a new parity line included in said bus system by each unit of a new design when said data handling units include both units of an old design and said new design for signalling when said number of said integrity bits is sufficient for verifying that all of said number of different parts of said each request applied to said bus is valid; and,
applying said predetermined signal on said new parity line only as an input to the checking means of each unit of said new design.

20. The method of claim 17 wherein said method further includes the step of assigning said one and said another one of said data handling units the same channel number for enabling said unit to transfer requests to itself during said number of allocated bus cycles of operation in said resilient manner.

* * * * *